(12) United States Patent
Polly et al.

(10) Patent No.: US 11,248,492 B2
(45) Date of Patent: Feb. 15, 2022

(54) SEAL ASSEMBLY FOR A GAS TURBINE ENGINE

(71) Applicant: United Technologies Corporation, Farmington, CT (US)

(72) Inventors: Joseph H. Polly, Tolland, CT (US); Sean P. McGee, Andover, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 93 days.

(21) Appl. No.: 16/356,082

(22) Filed: Mar. 18, 2019

(65) Prior Publication Data
US 2020/0300117 A1 Sep. 24, 2020

(51) Int. Cl.
*F01D 25/18* (2006.01)
*F01D 25/16* (2006.01)
(Continued)

(52) U.S. Cl.
CPC ............ *F01D 25/16* (2013.01); *F01D 11/003* (2013.01); *F01D 25/125* (2013.01); *F01D 25/24* (2013.01);
(Continued)

(58) Field of Classification Search
CPC .......... F16J 15/44–4478; F01D 25/183; F01D 25/18; F01D 25/16; F01D 25/24;
(Continued)

(56) References Cited

U.S. PATENT DOCUMENTS

| 3,053,590 | A | * | 9/1962 | Dison, Jr. | ............... F16C 33/80 |
| | | | | | 384/480 |
| 4,406,459 | A | * | 9/1983 | Davis | ................... F16J 15/3404 |
| | | | | | 277/401 |

(Continued)

FOREIGN PATENT DOCUMENTS

| CN | 105276192 | 1/2016 |
| EP | 1045178 | 10/2000 |

(Continued)

OTHER PUBLICATIONS

Boyce, M.P. (2002). Gas turbine engineering handbook. 2nd Edition. Gulf Publishing Company.

(Continued)

*Primary Examiner* — Woody A Lee, Jr.
*Assistant Examiner* — Behnoush Haghighian
(74) *Attorney, Agent, or Firm* — Carlson, Gaskey & Olds, P.C.

(57) ABSTRACT

A seal assembly for a gas turbine engine according to an example of the present disclosure includes, among other things, a rotatable shaft defining a longitudinal axis, and a bearing housing extending along the longitudinal axis to define a bearing compartment. The bearing housing has a first seal land defined along an inner diameter of the bearing housing, a seal carrier fixedly attached to an outer periphery of the shaft, and a seal member extending outwardly from the seal carrier. The seal member defines a plurality of helical grooves facing radially outward to establish a first sealing relationship with the first seal land, and each one of the helical grooves has a major component extending in an axial direction relative to the longitudinal axis. A method of sealing for a gas turbine engine is also disclosed.

20 Claims, 3 Drawing Sheets

(51) Int. Cl.
*F01D 11/00* (2006.01)
*F01D 25/12* (2006.01)
*F01D 25/24* (2006.01)
*F02C 7/20* (2006.01)
*F02C 7/28* (2006.01)
*F16J 15/16* (2006.01)
*F16J 15/34* (2006.01)
*F16J 15/447* (2006.01)

(52) U.S. Cl.
CPC .............. *F02C 7/20* (2013.01); *F01D 25/183* (2013.01); *F02C 7/28* (2013.01); *F05D 2220/32* (2013.01); *F16J 15/164* (2013.01); *F16J 15/3404* (2013.01); *F16J 15/4472* (2013.01)

(58) Field of Classification Search
CPC ........ F01D 25/125; F01D 11/003; F02C 7/20; F02C 7/06
See application file for complete search history.

(56) References Cited

U.S. PATENT DOCUMENTS

| | | | |
|---|---|---|---|
| 4,406,460 A * | 9/1983 | Slayton | F16J 15/164 |
| | | | 277/401 |
| 4,645,415 A | 2/1987 | Hovan et al. | |
| 4,709,545 A | 12/1987 | Stevens et al. | |
| 4,928,978 A * | 5/1990 | Shaffer | F01D 25/183 |
| | | | 277/401 |
| 5,415,478 A | 5/1995 | Matthew et al. | |
| 5,639,095 A * | 6/1997 | Rhode | F16J 15/4472 |
| | | | 277/303 |
| 5,658,127 A * | 8/1997 | Bond | F01D 25/183 |
| | | | 277/399 |
| 6,131,914 A * | 10/2000 | Proveaux | F01D 25/183 |
| | | | 277/412 |
| 6,568,688 B1 * | 5/2003 | Boeck | F01D 11/04 |
| | | | 277/411 |
| 6,858,056 B2 | 2/2005 | Kwan | |
| 6,932,350 B1 * | 8/2005 | Husted | F16J 15/406 |
| | | | 277/421 |
| 7,052,017 B2 * | 5/2006 | Uchida | F16J 15/4472 |
| | | | 277/413 |
| 7,093,418 B2 | 8/2006 | Morris et al. | |
| 7,334,982 B2 * | 2/2008 | Singh | F01D 25/183 |
| | | | 415/111 |
| 7,430,850 B2 | 10/2008 | Peters et al. | |
| 7,878,756 B2 * | 2/2011 | Davis | F01D 25/183 |
| | | | 415/1 |
| 7,935,164 B2 * | 5/2011 | Fang | F01D 25/18 |
| | | | 55/406 |
| 8,092,093 B2 * | 1/2012 | Fang | F01D 11/02 |
| | | | 384/477 |
| 8,371,127 B2 | 2/2013 | Durocher et al. | |
| 8,905,408 B2 * | 12/2014 | Garrison | F02C 7/28 |
| | | | 277/418 |
| 9,068,571 B2 * | 6/2015 | Hilaris | F04C 27/009 |
| 9,115,592 B2 | 8/2015 | Gauthier et al. | |
| 9,316,118 B2 | 4/2016 | Alvarez et al. | |
| 9,353,647 B2 * | 5/2016 | Bordne | F01D 25/20 |
| 9,382,844 B2 | 7/2016 | Muldoon et al. | |
| 9,506,366 B2 * | 11/2016 | Danescu | F01D 11/02 |
| 9,567,908 B2 * | 2/2017 | Bordne | F01D 25/183 |
| 9,683,451 B2 * | 6/2017 | Sonokawa | F02C 7/28 |
| 9,803,639 B2 * | 10/2017 | Hauser | F04C 15/0038 |
| 9,903,224 B2 | 2/2018 | Scott et al. | |
| 10,378,449 B2 * | 8/2019 | Chekansky | F16J 15/40 |
| 10,480,339 B2 * | 11/2019 | Kim | F01D 11/02 |
| 10,584,795 B2 * | 3/2020 | Peterson | F16J 15/4472 |
| 10,648,365 B2 * | 5/2020 | Snow | F01D 25/20 |
| 2006/0251512 A1 * | 11/2006 | Singh | F01D 25/183 |
| | | | 415/174.5 |
| 2009/0110545 A1 * | 4/2009 | Davis | F01D 25/183 |
| | | | 415/173.1 |
| 2009/0133581 A1 * | 5/2009 | Fang | F01D 25/18 |
| | | | 96/216 |
| 2010/0027926 A1 * | 2/2010 | Fang | F01D 25/183 |
| | | | 384/147 |
| 2013/0147123 A1 * | 6/2013 | Davies | F01D 11/02 |
| | | | 277/348 |
| 2013/0241153 A1 | 9/2013 | Garrison | |
| 2014/0119887 A1 | 5/2014 | Lyle et al. | |
| 2014/0159317 A1 | 6/2014 | Jahn | |
| 2014/0300058 A1 | 10/2014 | Brunet et al. | |
| 2015/0198065 A1 | 7/2015 | Pikovsky et al. | |
| 2015/0330251 A1 * | 11/2015 | Hanrahan | F01D 1/18 |
| | | | 415/1 |
| 2015/0337674 A1 * | 11/2015 | Sonokawa | F16J 15/3472 |
| | | | 415/173.3 |
| 2015/0369074 A1 | 12/2015 | Faulder | |
| 2016/0305283 A1 | 10/2016 | Morreale et al. | |
| 2016/0326959 A1 | 11/2016 | Burnside et al. | |
| 2017/0107854 A1 | 4/2017 | Friedl | |
| 2017/0159493 A1 * | 6/2017 | Snow | F02C 3/04 |
| 2018/0045316 A1 * | 2/2018 | Kovacik | F16J 15/324 |
| 2018/0306061 A1 | 10/2018 | Husband et al. | |
| 2019/0024663 A1 * | 1/2019 | Inazaki | F04C 27/009 |

FOREIGN PATENT DOCUMENTS

| | | |
|---|---|---|
| EP | 1255024 | 11/2002 |
| EP | 1724445 | 11/2006 |
| EP | 2157289 | 2/2010 |
| EP | 2604802 | 6/2013 |
| EP | 3293360 | 9/2017 |
| EP | 3282153 | 2/2018 |
| EP | 3421737 | 1/2019 |
| FR | 3067057 | 12/2018 |
| KR | 20130055921 | 5/2013 |

OTHER PUBLICATIONS

European Search Report for European Patent Application No. 20163752.7 completed May 20, 2020.
European Search Report for European Patent Application No. 18179970 completed Oct. 11, 2018.
European Search Report for European Application No. 18190748.6 completed Nov. 29, 2018.

* cited by examiner

SEAL ASSEMBLY FOR A GAS TURBINE ENGINE

BACKGROUND

This disclosure relates to sealing for a gas turbine engine, including sealing of bearing compartments.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Bearing compartments typically receive fluid for cooling and lubricating one or more bearings. The bearing compartment may include seals that fluidly separate the bearing compartment from adjacent cavities.

SUMMARY

A seal assembly for a gas turbine engine according to an example of the present disclosure includes a rotatable shaft defining a longitudinal axis, and a bearing housing extending along the longitudinal axis to define a bearing compartment. The bearing housing has a first seal land defined along an inner diameter of the bearing housing, a seal carrier fixedly attached to an outer periphery of the shaft, and a seal member extending outwardly from the seal carrier. The seal member defines a plurality of helical grooves facing radially outward to establish a first sealing relationship with the first seal land, and each one of the helical grooves has a major component extending in an axial direction relative to the longitudinal axis.

In a further embodiment of any of the foregoing embodiments, the seal member includes a seal body that has a plurality of helical teeth that are interdigitated with the plurality of helical grooves, and each of the helical teeth has a radial face defining an outer diameter of the seal body.

In a further embodiment of any of the foregoing embodiments, the seal member includes a seal body that has a first vertical face and a second vertical face axially spaced apart from the first vertical face, and each one of the helical grooves extends in the axial direction along the outer diameter of the seal body from the first vertical face to the second vertical face.

In a further embodiment of any of the foregoing embodiments, each one of the helical grooves defines a respective helix angle relative to the longitudinal axis, and the helix angle is between 5 degrees and 45 degrees.

In a further embodiment of any of the foregoing embodiments, the bearing housing defines a drain passage that has a drain port defined along the bearing compartment, and the drain passage defines a passage axis that has a projection that intersects the seal member.

A further embodiment of any of the foregoing embodiments includes at least one secondary seal extending outwardly from the seal carrier to establish a second sealing relationship with a second seal land defined along the inner diameter of the bearing housing.

In a further embodiment of any of the foregoing embodiments, the seal member establishes the first sealing relationship along a fluid passage at a position between the bearing compartment and the at least one secondary seal.

In a further embodiment of any of the foregoing embodiments, the seal member and the at least secondary seal are integrally formed with the seal carrier.

In a further embodiment of any of the foregoing embodiments, the bearing housing defines a drain passage extending between first and second ports. The first port is defined along the bearing compartment. The second port is defined along the inner diameter of the bearing housing at a position axially between the at least one secondary seal and the seal member to fluidly couple the drain passage and the fluid passage.

In a further embodiment of any of the foregoing embodiments, the drain passage defines a passage axis that is sloped towards the seal member.

In a further embodiment of any of the foregoing embodiments, a wall of the bearing housing bounds a plenum. The plenum is fluidly coupled to a fluid source, and the helical grooves are dimensioned to convey fluid from the plenum to the bearing compartment in response to rotation of the seal carrier about the engine longitudinal axis.

In a further embodiment of any of the foregoing embodiments, the seal member includes a seal body defining a plurality of helical teeth that are interdigitated with the plurality of helical grooves, and each of the helical teeth has a radial face defining an outer diameter of the seal body. Each one of the helical grooves defines a respective helix angle relative to the engine longitudinal axis, and the helix angle is between 5 degrees and 45 degrees.

In a further embodiment of any of the foregoing embodiments, the seal assembly includes first and second knife edge seals that extend outwardly from the seal carrier to establish second and third sealing relationships with second and third seal lands defined by the bearing housing.

In a further embodiment of any of the foregoing embodiments, the bearing housing defines a drain passage extending between first and second ports. The first port is defined along the bearing compartment, and the second port defined along an inner diameter of the bearing housing. The inner diameter defines the first seal land, and the drain passage defines a passage axis that has a projection that intersects the seal member.

A further embodiment of any of the foregoing embodiments includes first and second knife edge seals extending outwardly from the seal carrier to establish first and second sealing relationships with second and third seal lands defined along the inner diameter of the bearing housing. The seal member establishes the first sealing relationship along a fluid passage at a position between the bearing compartment and the first and second knife edge seals, and the second port is defined along the fluid passage between the seal member and the first and second knife edge seals. The seal member and the first and second knife edge seals are integrally formed with the seal carrier.

A method of sealing for a gas turbine engine according to an example of the present disclosure includes rotating a seal member relative to a bearing housing to establish a first sealing relationship along a fluid passage. The bearing housing extends along a longitudinal axis to define a bearing compartment. The fluid passage interconnects the bearing compartment and a plenum. The plenum is fluidly coupled to a fluid source that conveys pressurized airflow. The seal member defines a plurality of helical teeth that are interdigitated with a plurality of helical grooves about an outer diameter of the seal member to establish the first sealing relationship in response to the rotating, and each one of the helical grooves has a major component extending in an axial direction relative to the longitudinal axis.

In a further embodiment of any of the foregoing embodiments, the bearing compartment includes a bearing that supports a rotatable shaft. The seal member is mounted to the shaft, and the rotating step includes rotating the shaft about the longitudinal axis.

A further embodiment of any of the foregoing embodiments includes communicating lubricant from the fluid passage to a drain passage. The drain passage extends between first and second ports. The first port is defined along the bearing compartment. The second port is defined along an inner diameter of the bearing housing, and the drain passage defines a passage axis that has a projection that intersects the seal member.

In a further embodiment of any of the foregoing embodiments, the rotating step includes establishing a second sealing relationship between the bearing housing and at least one knife edge seal. The seal member and the at least one knife edge seal extending outwardly from a seal carrier. The seal carrier fixedly attached to an outer periphery of the shaft.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
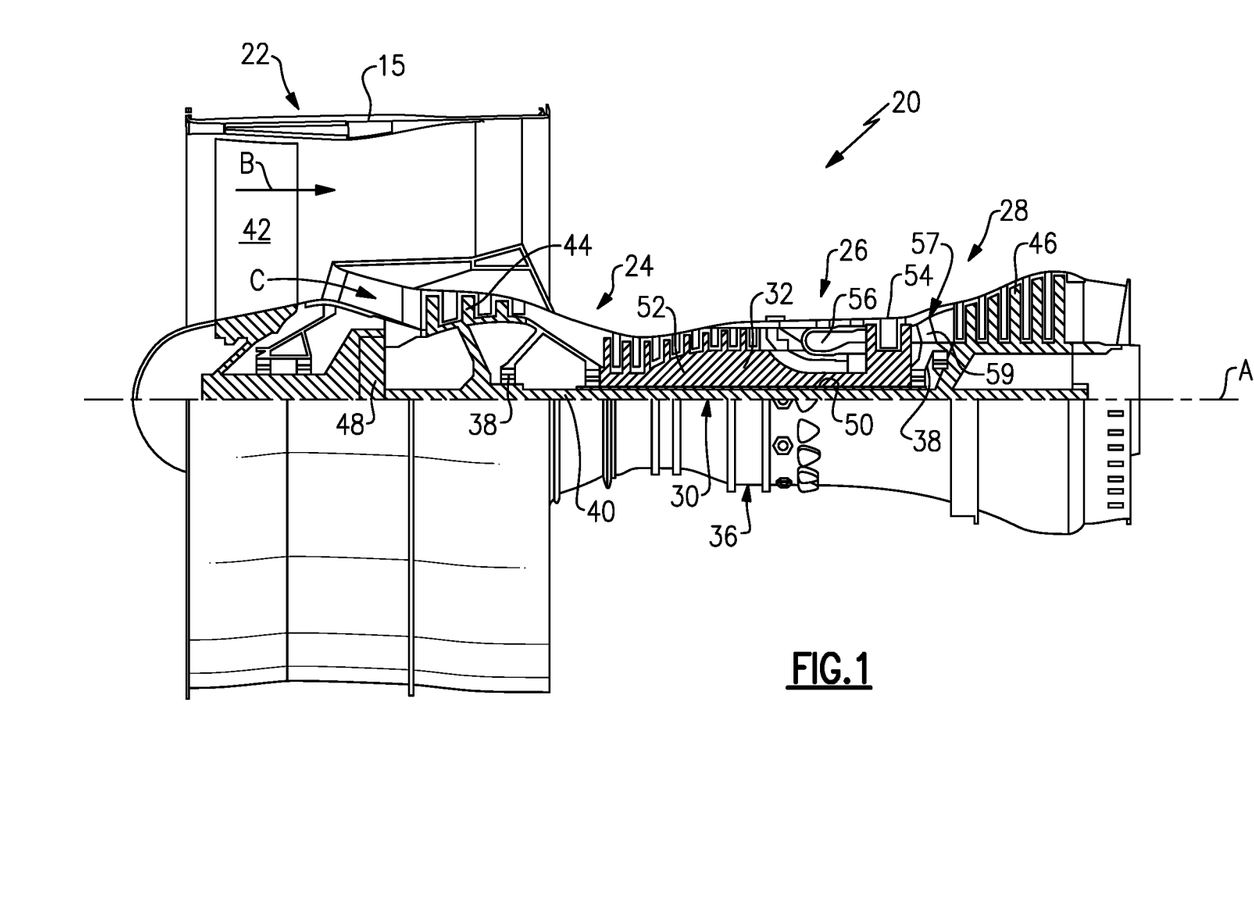
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ram} \,°\, R)/(518.7° \, R)]^{0.5}$. The "Low corrected fan tip speed" as disclosed herein according to one non-limiting embodiment is less than about 1150 ft/second (350.5 meters/second).

Figure 2:
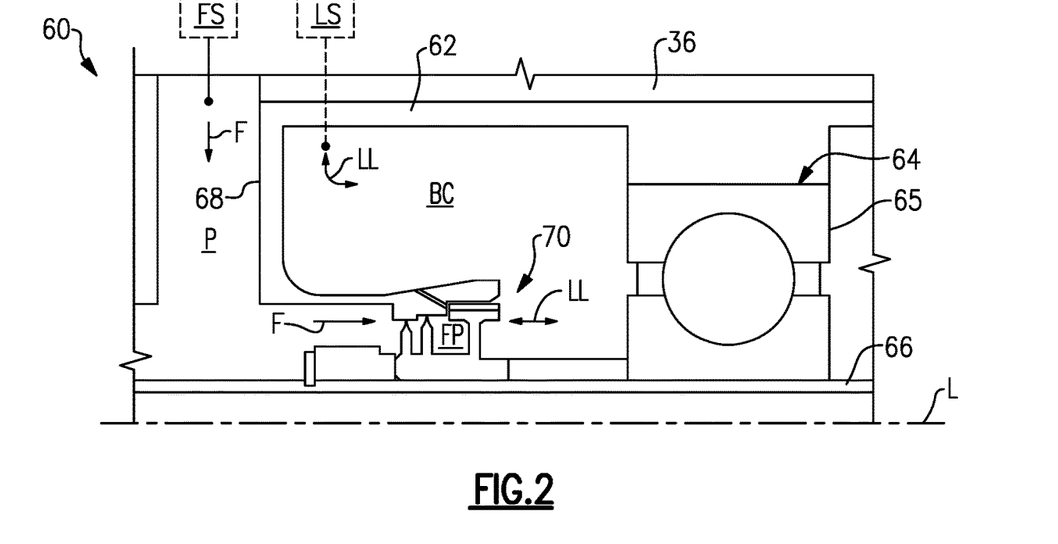
FIG. 2 illustrates a bearing assembly.
Figure 3:
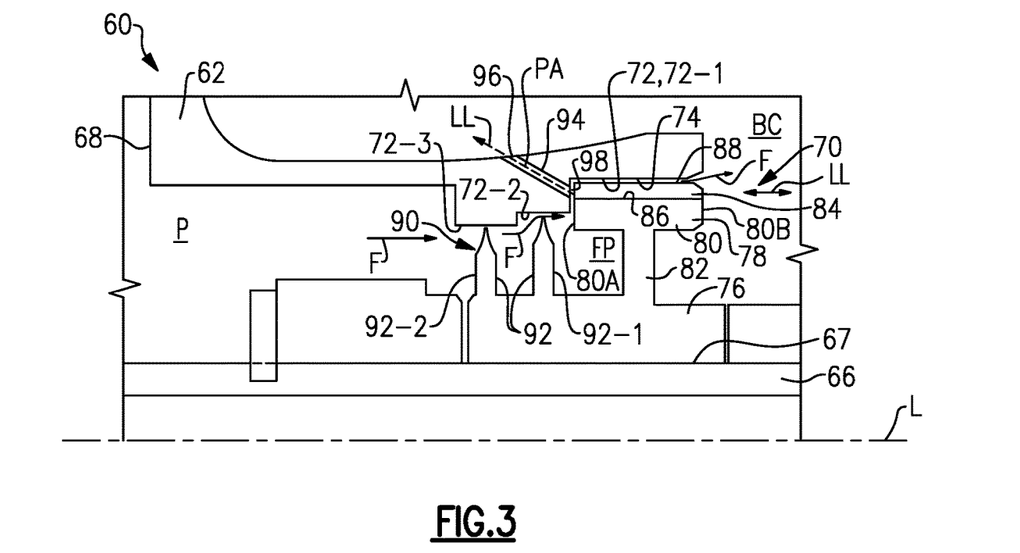
FIG. 3 illustrates portions of the bearing assembly of FIG. 2 including a seal assembly.

FIGS. 2-3 illustrate a bearing assembly 60 according to an example. The bearing assembly 60 can be incorporated into the compressor section 24 or turbine section 28 of the gas turbine engine 20, such as one of the bearing systems 38, for example. Other components of the engine 20 and other systems may benefit from the teachings herein, such as a towershaft coupled to one of the shafts 40, 50 for starting the engine or driving an auxiliary power unit, fluid paths established between rotating and static components, and bearing arrangements within industrial turbines.

Referring to FIG. 2, the bearing assembly 60 includes a bearing housing 62 that is attached or otherwise secured to a portion of the engine static structure 36. The bearing housing 62 extends along a longitudinal axis L to bound or otherwise define at least a portion of a bearing compartment BC. It should be appreciated that the bearing compartment BC can be defined by other portions of the engine static structure 36. The longitudinal axis L can be co-axial with or parallel to the engine longitudinal axis A of FIG. 1.

The bearing assembly 60 includes one or more bearings 64 (one shown for illustrative purposes) situated or received in the bearing compartment BC. Each bearing 64 can include one or more components such as a bearing carrier 65 including rotatable and static portions for supporting rotatable components of the bearing 64. In the illustrative example of FIG. 2, bearing 64 is a ball bearing. Other example bearings include roller bearings and taper bearings. The bearing 64 supports a rotatable shaft 66. The shaft 66 extends along and defines the longitudinal axis L. The shaft 66 can include one or more portions mechanically attached to each other for rotation about the longitudinal axis L. The turbine section 28 can drive at least one of the fan sections 22 and compressor sections 24 through the shaft 66, for example.

The bearing compartment BC is an oil wetted environment that fluidly communicates with a lubricant source LS (shown in dashed lines) to deliver a lubricant LL such as oil to the bearing BC. The lubricant source LS can be an oil tank coupled to the engine 20 or aircraft, for example.

A wall 68 of the bearing housing 62 bounds an airflow compartment or plenum P. In other examples, wall 68 is a separate and distinct component from the bearing housing 62. The plenum P is fluidly coupled to a fluid source FS (shown in dashed lines for illustrative purposes). The fluid source FS is operable to convey pressurized flow F to the plenum P. Example fluid sources FS can include pressurized bleed air from the compressor section 24 or another dedicated cooling supply, for example.

In some scenarios or operating regimes of the engine 20, a relatively small difference in pressure may exist between the bearing compartment BC and plenum P. Buffer airflow at a relatively high pressure may otherwise need to be conveyed to the plenum P to maintain a sealing relationship across the perimeter of the bearing compartment BC.

The bearing assembly 60 includes at least one seal assembly 70 that bounds or otherwise defines a perimeter of the bearing compartment BC and a perimeter of the plenum P. The seal assembly 70 establishes a fluid passage FP interconnecting the bearing compartment BC and plenum P. The seal assembly 70 conveys pressurized airflow or fluid F to the perimeter of the bearing compartment BC to oppose migration of lubricant LL from the bearing compartment BC to the plenum P. The seal member 78 includes one or more features that can establish a sealing relationship in a relatively low pressure differential environment and can reduce or otherwise eliminate the need for lubricant to establish the sealing relationship.

Referring to FIG. 3, with continuing reference to FIG. 2, the bearing housing 62 includes one or more seal lands 72 defined along an inner diameter 74 of the bearing housing 62. In the illustrated example of FIG. 3, the bearing housing 62 includes three axially adjacent seal lands 72 (indicated at 72-1 to 72-3) that face inwardly towards the longitudinal axis L. Surfaces defining the seal lands 72 can be generally smooth or planar.

The seal assembly 70 is arranged to fluidly separate the bearing compartment BC from the plenum P and to contain or otherwise oppose migration of lubricant LL from the bearing compartment BC to the plenum P, thereby reducing a likelihood of degradation of components of the engine 20 in relative high temperature locations such the compressor section 24 or turbine section 28 of FIG. 1.

The seal assembly 70 including a seal carrier 76 and a seal member 78. The seal carrier 76 is fixedly attached to an outer periphery 67 of the shaft 66. In other examples, the seal carrier 76 is mechanically attached or otherwise secured to the bearing housing 62, to another portion of the engine static structure 36. The seal member 78 is dimensioned to extend outwardly from the seal carrier 76. The seal member 78 is a non-contacting type seal including a seal body 80 and a neck portion 82 that interconnects the seal carrier 76 and seal body 80. The seal body 80, neck portion 82, and seal carrier 76 are each swept about the longitudinal axis L to have a generally ring-shaped geometry. The seal member 78 is dimensioned to extend outwardly in an axial direction from the neck portion 82 to form a shroud such that a cross section of the seal member 78 and neck portion together have a generally T-shaped geometry. The seal body 80, neck portion 82, and seal carrier 76 can be integrally formed. In other examples, the seal body 80, neck portion 82, and/or seal carrier 76 are separate and distinct components that are mechanically attached to each other.

Figure 5:
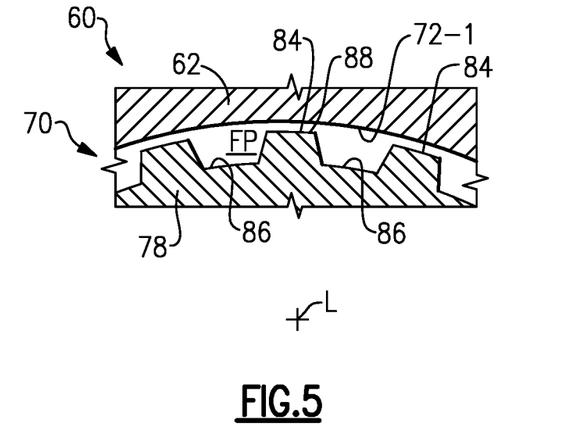
FIG. 5 illustrates a sectional view of the seal assembly taken along line 4-4 of FIG. 3.

The seal body 80 includes a plurality of helical teeth 84 interdigitated with a plurality of helical grooves 86. As illustrated by FIGS. 3 and 5, the helical teeth 84 and helical grooves 86 are placed in close proximity to the inner diameter 74 of the bearing housing 62 to establish a sealing relationship with the first seal land 72-1. As illustrated by FIG. 5, each of the helical teeth 84 has a generally rectangular cross sectional geometry, with a radially face defining an outer diameter 88 of the seal body 80. The generally rectangular cross sectional can reduce wear of surfaces of the helical teeth 84 and/or first seal land 72-1 that may otherwise occur during contact.

The helical teeth 84 and helical grooves 86 are dimensioned to convey fluid F from the plenum P to a perimeter of the bearing compartment BC in response to rotation of the seal carrier 76 about the longitudinal axis L. During operation, the helical teeth 84 produce an axial force component relative to the longitudinal axis L when interacting with fluid F such as airflow and/or lubricant. The helical teeth 84 can be arranged to serve as an axial air or fluid pump to augment the pressure differential between the fluid source FS and the bearing compartment BC, with fluid F conveyed through the helical grooves 86.

Figure 4:
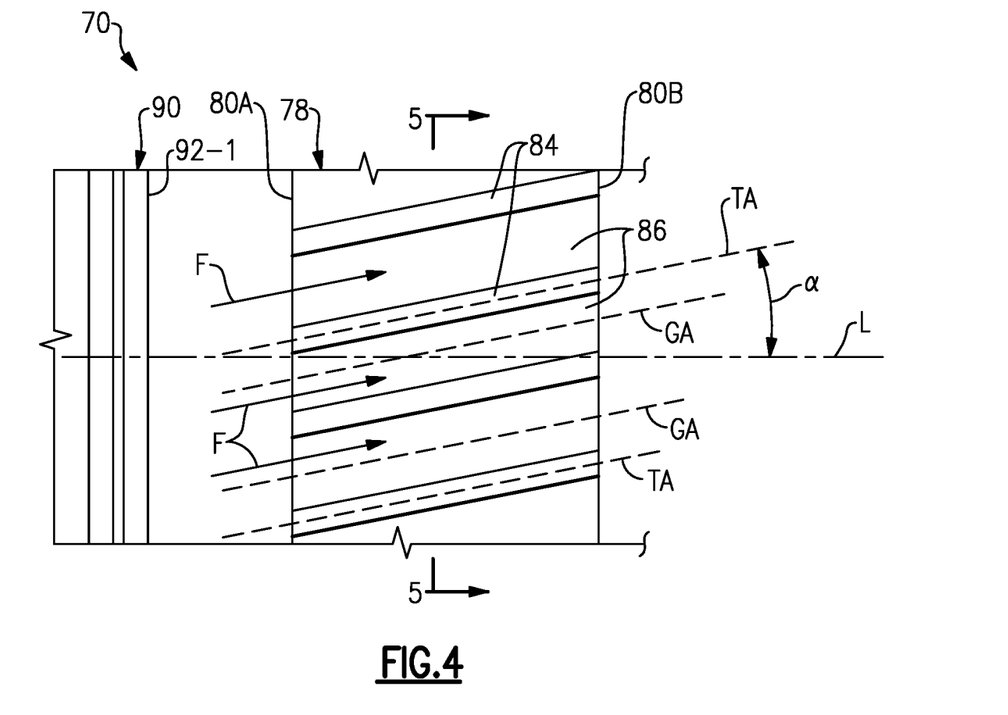
FIG. 4 illustrates a plan view of the seal assembly of FIG. 3.

Referring to FIGS. 3-4, the seal body 80 includes a first vertical face 80A and a second vertical face 80B axially spaced apart from the first vertical face 80A. The helical teeth 84 and helical grooves 86 extend at least partially between the first and second vertical faces 80A, 80B. In the illustrative example of FIGS. 3-4, each one of the helical teeth 84 and helical grooves 86 is dimensioned to extend in an axial direction with respect to the longitudinal axis L along the outer diameter 88 of the seal body 80 from the first vertical face 80A to the second vertical face 80B.

Referring to FIG. 4, with continuing reference to FIG. 3, each of the helical teeth 84 defines a respective tooth axis TA. Each of the grooves 86 defines a respective groove axis GA. Each tooth axis TA and/or groove axis GA is skewed relative to the longitudinal axis L. The helical teeth 84 can be dimensioned with respect to diametral pitch (i.e., number of teeth per inch of pitch diameter), helix angle, and face width.

Each tooth axis TA defines a respective helix angle α with respect to the longitudinal axis L. In some examples, the helix angle α is equal to or greater than 5 degrees. In further examples, the helix angle α is less than or equal to 45 degrees, such as between 15 and 30 degrees. Each groove axis GA is defined such that each one of the helical grooves 86 has a major component that extends in the axial direction relative to the longitudinal axis L. In examples, each of the helical teeth 84 and helical grooves 86 extends no more than a quarter rotation about the longitudinal axis L. The helical teeth 84 and helical grooves 86 can have left or right handed orientations relative to the longitudinal axis L.

Referring back to FIG. 3, the seal assembly 70 can include at least one secondary seal 90, such as a labyrinth seal arrangement including at least one knife edge seal 92. Although the one secondary seal 90 of FIG. 3 includes knife edge seals 92, other seals can be utilized such as another non-contacting type seals and brush seals. The seal member 78 is arranged to establish a primary (or first) sealing relationship that is sequential with a secondary (or second) sealing relationship established by the secondary seal 90 adjacent the bearing compartment BC. The seal member 78 establishes a sealing relationship along the fluid passage FP at a position between the bearing compartment BC and the secondary seal 90. The knife edge seals 92 can serve to provide secondary sealing of the bearing compartment BC during low and/or no speed operations, for example. The knife edge seals 92 can also serve as a pressure limiter to oppose communication of flow F by the seal member 78 should communication of flow F exceed a predetermined threshold.

In the illustrated example of FIG. 3, the secondary seal 90 includes first and second knife edge seals 92-1, 92-2 that are spaced apart axially with respect to the longitudinal axis L. Each of the knife edge seals 92-1, 92-2 extends outwardly from the seal carrier 76 to establish a respective sealing relationship with the second and third seal lands 72-2, 72-3. The knife-edge seals 92 and seal member 78 can be integrally formed with the seal carrier 76. Although the secondary seal 90 is disclosed having two knife edge seals 92-1, 92-2, it should be understood that the secondary seal 90 can have fewer or more than two seals to reduce leakage across the fluid passage FP.

The bearing assembly 60 can include one or more features that recapture lubricant LL that may escape or migrate away from the bearing assembly BC during engine operation. The bearing housing 62 defines a drain passage (or drainback hole) 94 in a thickness of the wall 68 of the bearing housing 62. The drain passage 94 extends along a passage axis PA between first and second ports 96, 98. The drain passage 94 is dimensioned such that the passage axis PA is sloped towards the seal member 78 and/or longitudinal axis L. A projection of the passage axis PA can be oriented to intersect a surface of the seal member 78, such as the first vertical face 80A of the seal member 78 and inlets of the helical grooves 86 as illustrated by FIG. 3.

The first port 96 is a drain port that is defined in the bearing housing 62 along a surface of the bearing compartment BC that is opposed to the inner diameter 74 of the bearing housing 62. The second port 98 is defined along the inner diameter 74 of the bearing housing 62 and along the fluid passage FP at a position axially between the seal member 78 and secondary seal 90 to fluidly couple the drain passage 94 and fluid passage FP. The second port 98 and helical teeth 84 can be radially aligned with respect to the longitudinal axis L, as illustrated by FIG. 3. First and/or second ports 96, 98 can be defined at a bottom dead center (BDC) position of the bearing compartment BC, which is opposed to a top dead center (TDC) position. For the purposes of this disclosure, the "top dead center" and "bottom dead center" positions are defined with respect to an assembled positon of the bearing assembly 60 in the engine.

The drain passage 94 allows any lubricant LL that collects in the bottom of the bearing housing 62 to drain back into the bearing compartment BC. The drain passage 94 can also limit the localized low pressure zone adjacent the seal assembly 70 such that the drain passage 94 limits or otherwise reduces a likelihood of aerodynamic flutter of the knife edge seals 92 and bearing housing 62 during operation.

Operation of the seal assembly 70 is as follows. The seal member 78 is rotated relative to the bearing housing 62 to establish a first sealing relationship along the fluid passage FP. The helical teeth 84 and helical grooves 86 are dimensioned to establish the first sealing relationship in response to rotating the seal member 78. The seal carrier 76 and seal member 78 are mounted to the shaft 66 such that rotating the shaft 66 about the longitudinal axis L establishes the first sealing relationship. Second and third sealing relationships can be established by the respective knife-edge seals 92-1, 92-2 in response to rotating the seal carrier 76.

Rotation of the seal assembly 70 generates a pumping action to cause airflow or fluid F from the plenum P to move in an axial direction across the seal member 78 to the bearing compartment BC. Rotation of seal assembly 70 including the helical teeth 84 creates a localized positive pressure differential that augments the buffer source pressure of fluid F from the fluid source FS such that the seal assembly 70 can maintain a sealing relationship at relative low and/or negative differential pressures. The seal member 78 opposes migration of lubricant LL along the fluid passage FP. The axial movement of the fluid F serves to carry any oil particles or lubricant LL back into the bearing compartment BC and creates an air or fluid barrier that minimizes or otherwise reduces a likelihood that lubricant LL escapes or migrates from the bearing compartment BC. The seal assembly 70 is operable to communicate the lubricant LL from the fluid passage FP to the drain passage 94, which is then drained or otherwise communicated from the drain passage 94 back to the bearing compartment BC to recapture the lubricant LL.

The arrangements disclosed herein, including bearing and seal assembly 60, 70, can improve sealing of the bearing compartment BC, including operating seal assembly 70 in low pressure differential environments which can reduce or avoid the need for an augmented air supply during starting and low speed motoring of the engine 20. A relatively lower pressure source can be utilized for buffer airflow to the bearing compartment BC, which can improve efficiency of the respective compressor providing the buffer airflow, for example. The seal assembly 70 does not require lubricant to establish a sealing relationship due to a lack of a heat generating component, which can reduce demands on a thermal management system associated with the engine 20. The bearing and seal assembly 60, 70 disclosed herein can reduce a likelihood of a lubricant such as oil flowing from the bearing compartment BC into adjacent portions of the engine 20, which can reduce emissions and a likelihood of auto-ignition of migrated lubricant.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
    a rotatable shaft defining a longitudinal axis;
    a bearing housing extending along the longitudinal axis to define a bearing compartment, the bearing housing including a first seal land defined along an inner diameter of the bearing housing relative to the longitudinal axis;
    a seal carrier fixedly attached to a radially outer periphery of the shaft relative to the longitudinal axis; and
    a seal member extending radially outwardly from the seal carrier relative to the longitudinal axis, the seal member defining a plurality of helical grooves facing radially outward relative to the longitudinal axis to establish a first sealing relationship with the first seal land with the helical grooves extending from an axially forwardmost edge of the seal member relative to the longitudinal axis to an axially aftmost edge of the seal member relative to the longitudinal axis, and each one of the helical grooves extends in a direction having a major component extending in an axial direction relative to the longitudinal axis, wherein the major component of each one of the helical grooves defines a respective helix angle in a downstream direction relative to the longitudinal axis, and the helix angle is between 5 degrees and 45 degrees.

2. The seal assembly as recited in claim 1, wherein the seal member includes a seal body including a plurality of helical teeth that are interdigitated with the plurality of helical grooves, and each of the helical teeth has a radial face defining an outer diameter of the seal body relative to the longitudinal axis with the radial face facing radially outward relative to the longitudinal axis and the plurality of helical teeth are radially aligned with a bearing, the plurality of helical teeth extend from the axially forwardmost edge of the seal member to the axially aftmost edge of the seal member, and a neck connects the seal body with the seal carrier with the seal body having a greater axial length relative to the longitudinal axis the the neck.

3. The seal assembly as recited in claim 1, wherein the seal member includes a seal body having a first vertical face and a second vertical face axially spaced apart from the first vertical face relative to the longitudinal axis, and each one of the helical grooves extends in the axial direction relative to the longitudinal axis along the outer diameter of the seal body from the first vertical face to the second vertical face, wherein the first vertical face is an axially forwardmost face relative to the longitudinal axis and the second vertical face is an axially aftmost face relative to the longitudinal axis.

4. The seal assembly as recited in claim 1, wherein the bearing housing defines a drain passage having a drain port defined along the bearing compartment, and the drain passage defines a passage axis having a projection that intersects the seal member.

5. The seal assembly as recited in claim 1, further comprising at least one secondary seal extending radially outward from the seal carrier relative to the longitudinal axis to establish a second sealing relationship with a second seal land defined along the inner diameter of the bearing housing.

6. The seal assembly as recited in claim 5, wherein the seal member establishes the first sealing relationship along a fluid passage at a position between the bearing compartment and the at least one secondary seal.

7. The seal assembly as recited in claim 6, wherein the seal member and the at least secondary seal are integrally formed with the seal carrier.

8. The seal assembly as recited in claim 6, wherein the bearing housing defines a drain passage extending between first and second ports, the first port defined along the bearing compartment, the second port defined along the inner diameter of the bearing housing at a position axially between the at least one secondary seal and the seal member relative to the longitudinal axis to fluidly couple the drain passage and the fluid passage.

9. The seal assembly as recited in claim 8, wherein the drain passage defines a passage axis that is sloped towards the seal member.

10. A gas turbine engine comprising:
    a fan section including a plurality of fan blades;
    a compressor section;
    a turbine section driving at least one of the fan section and the compressor section through a rotatable shaft that extends along an engine longitudinal axis; and
    a bearing assembly comprising:
        a bearing housing extending along the engine longitudinal axis to define a bearing compartment, the bearing housing defining a first seal land;
        a bearing in the bearing compartment that supports the shaft; and
        a seal assembly comprising:
            a seal carrier fixedly attached to the shaft; and
            a seal member extending radially outward from the seal carrier relative to the longitudinal axis, the seal member defining a plurality of helical grooves facing radially outward relative to the engine longitudinal axis to establish a first sealing relationship with the first seal land with the helical grooves extending from an axially forwardmost edge of the seal member relative to the longitudinal axis to an axially aftmost edge of the seal member relative to the longitudinal axis, and each one of the helical grooves extends in a direction having a major component extending in an axial direction relative to the engine longitudinal axis, wherein the major component of each one of the helical grooves defines a respective helix angle in a downstream direction relative to the longitudinal axis, and the helix angle is between 5 degrees and 45 degrees.

11. The gas turbine engine as recited in claim 10, wherein a wall of the bearing housing bounds a plenum, the plenum being fluidly coupled to a fluid source, and the helical grooves fluidly connect the plenum with the bearing compartment for conveying fluid from the plenum to the bearing compartment when the seal carrier rotates about the engine longitudinal axis.

12. The gas turbine engine as recited in claim 11, wherein:
the seal member includes a seal body defining a plurality of helical teeth that are interdigitated with the plurality of helical grooves, and each of the helical teeth has a radial face defining an outer diameter of the seal body relative to the engine longitudinal axis with each of the helical teeth are radially aligned with the bearing, the plurality of helical teeth extend from the axially forwardmost edge of the seal body member to the axially aftmost edge of the seal member, and a neck connects the seal body with the seal carrier with the seal body having a greater axial length relative to the longitudinal axis than the neck.

13. The gas turbine engine as recited in claim 12, wherein the seal assembly includes first and second knife edge seals that extend radially outward from the seal carrier relative to the engine longitudinal axis to establish second and third sealing relationships with second and third seal lands defined by the bearing housing.

14. The gas turbine engine as recited in claim 10, wherein the bearing housing defines a drain passage extending between first and second ports, the first port defined along the bearing compartment, and the second port defined along an inner diameter of the bearing housing relative to the engine longitudinal axis, the inner diameter defining the first seal land, and the drain passage defines a passage axis having a projection that intersects the seal member.

15. The gas turbine engine as recited in claim 14, further comprising:
first and second knife edge seals extend radially outward from the seal carrier relative to the engine longitudinal axis to establish first and second sealing relationships with second and third seal lands defined along the inner diameter of the bearing housing;
wherein the seal member establishes the first sealing relationship along a fluid passage at a position between the bearing compartment and the first and second knife edge seals, and the second port is defined along the fluid passage between the seal member and the first and second knife edge seals; and
wherein the seal member and the first and second knife edge seals are integrally formed with the seal carrier.

16. A method of sealing for a gas turbine engine comprising:
rotating a seal member relative to a bearing housing to establish a first sealing relationship along a fluid passage;
wherein the bearing housing extends along a longitudinal axis to define a bearing compartment, the fluid passage interconnecting the bearing compartment and a plenum, the plenum fluidly coupled to a fluid source that conveys pressurized airflow; and
wherein the seal member defines a plurality of helical teeth that are interdigitated with a plurality of helical grooves with both the plurality of helical teeth and the plurality of helical grooves extending from an axially forwardmost edge of the seal member relative to the longitudinal axis to an axially aftmost edge of the seal member relative to the longitudinal axis, the plurality of helical grooves is located about an outer diameter of the seal member relative to the longitudinal axis to establish the first sealing relationship in response to the rotating, and each one of the helical grooves extends in a direction having a major component extending in an axial direction relative to the longitudinal axis and the major component of each one of the helical grooves defines a respective helix angle in a downstream direction relative to the longitudinal axis, and the helix angle is between 5 degrees and 45 degrees.

17. The method as recited in claim 16, wherein the bearing compartment includes a bearing that supports a rotatable shaft, the seal member is mounted to the shaft, and the rotating step includes rotating the shaft about the longitudinal axis, the plurality of helical teeth is radially aligned with the bearing.

18. The method as recited in claim 17, further comprising communicating lubricant from the fluid passage to a drain passage, the drain passage extending between first and second ports, the first port defined along the bearing compartment, the second port defined along an inner diameter of the bearing housing relative to the longitudinal axis, and the drain passage defining a passage axis having a projection that intersects the seal member.

19. The method as recited in claim 17, wherein the rotating step includes establishing a second sealing relationship between the bearing housing and at least one knife edge seal, the seal member and the at least one knife edge seal extending radially outward from a seal carrier relative to the longitudinal axis, the seal carrier fixedly attached to a radially outer periphery of the shaft relative to the longitudinal axis.

20. The seal assembly as recited in claim 1, further comprising at least one secondary seal extending radially outward from the seal carrier relative to the longitudinal axis to establish a second sealing relationship with a second seal land defined along the inner diameter of the bearing housing.

* * * * *